(12) United States Patent
Pyle

(10) Patent No.: US 6,199,485 B1
(45) Date of Patent: Mar. 13, 2001

(54) RAIL CONVERSION MODULE FOR ROAD TRACTOR

(76) Inventor: James Lee Pyle, P.O. Box 462, Harrodsburg, KY (US) 40330

( * ) Notice: Subject to any disclaimer, the term of this patent is extended or adjusted under 35 U.S.C. 154(b) by 0 days.

(21) Appl. No.: 09/366,737

(22) Filed: Aug. 4, 1999

(51) Int. Cl.[7] .................................................. B61C 11/00
(52) U.S. Cl. ........................................ 105/72.2; 105/26.1
(58) Field of Search ................................ 105/72.2, 26.1, 105/75

(56) References Cited

U.S. PATENT DOCUMENTS

| | | |
|---|---|---|
| 3,198,137 | 8/1965 | White, Jr. . |
| 3,633,514 * | 1/1972 | Deike .................................. 105/26.1 |
| 3,638,579 * | 2/1972 | Yard .................................... 105/26.1 |
| 3,884,156 | 5/1975 | Ames et al. . |
| 4,067,259 | 1/1978 | Ames et al. . |
| 4,086,856 * | 5/1978 | Chenoweth ......................... 105/26.1 |
| 4,167,142 | 9/1979 | Ames et al. . |
| 4,174,667 * | 11/1979 | Chenoweth ......................... 105/26.1 |
| 4,266,483 * | 5/1981 | Rannanmaki ....................... 105/26.1 |
| 4,380,198 * | 4/1983 | White, Jr. ............................ 105/26.1 |
| 4,497,257 * | 2/1985 | White, Jr. ............................ 105/26.1 |
| 4,537,137 * | 8/1985 | White, Jr. ............................ 105/26.1 |
| 5,156,639 * | 10/1992 | Bostrom ............................. 105/72.2 |
| 5,168,815 | 12/1992 | Comer et al. . |
| 5,649,490 * | 7/1997 | Lovitt ................................. 105/72.2 |

* cited by examiner

*Primary Examiner*—S. Joseph Morano
*Assistant Examiner*—Lars A. Olson
(74) *Attorney, Agent, or Firm*—Charles J. Brown

(57) ABSTRACT

A rail conversion module for a tractor allowing the tractor to be driven either on the ground or on railroad tracks wherein a hinged module frame fits under the tractor with front rail wheels on a frame front section being attached to the tractor and adapted to be raised for ground travel or lowered for rail travel and driven rear rail wheels on a frame rear section which by a hinge mounting can be raised for ground travel or lowered for rail travel.

10 Claims, 3 Drawing Sheets

RAIL CONVERSION MODULE FOR ROAD TRACTOR

BACKGROUND OF THE INVENTION

For many years specially constructed traction vehicles have been available which operate both on roads and on railroad tracks. Typically they are small rail locomotives with four road wheels which can be raised to permit ordinary railroad travel on rail wheels or lowered to the ground so as to lift the rail wheels and permit road travel. Examples are the vehicles described in U.S. Pat. Nos. 3,198,137, 3,884,156, 4,067,259, 4,167,142 and 5,168,815. They are of relatively complicated design and quite expensive.

The object of the present invention is to achieve all of the major functions of these known specially built road-rail vehicles at a small fraction of their cost. This is achieved by utilizing a conventional farm tractor for whatever road travel is required of the road-rail vehicle, whether to pull loads or simply to move on the ground from one rail site to another. Then for rail operation a special conversion module is to be attached beneath the farm tractor. This module is to have vertically movable rail wheels which can be retracted upwardly to allow the farm tractor to continue its ordinary functions travelling on the ground. When rail travel is required the rail wheels are to be lowered to tracks so as to lift the tractor and elevate its road wheels off the ground. The tractor engine through its conventional power take-off is to drive the rail wheels and move the vehicle along the railroad track either alone or pulling railroad cars.

SUMMARY OF THE INVENTION

The present invention is for use with a conventional engine driven tractor having a chassis with a rear power take-off and a fluid power system, preferably hydraulic. Respective pairs of coaxial front steering and rear driving ground wheels are on the tractor each spaced differently, usually wider, than rails of a railroad track. A rail conversion module is provided in accordance with the invention mountable on the tractor chassis and it includes respective pairs of coaxial front and rear rail wheels spaced for rolling engagement on the tracks. A module frame is provided having hinged front and rear sections with the front rail wheels on the front section and the rear rail wheels on the rear section. Attachment means are included on the module frame for affixing the front section to the tractor chassis. An articulated connector is included for placing the rear rail wheels in driving relation with the tractor power take-off. Lifting means are located on the module frame operable by the tractor fluid system for raising and lowering the front rail wheels with respect to the frame front section. Pivoting means are also on the module frame operable by the tractor fluid power system for turning the rear section so as to raise and lower the rear rail wheels with respect to the front section. With this structure upon driving the tractor over the module frame front section with all rail wheels raised, the front frame section is affixed to the tractor chassis, the rear rail wheels are connected to the tractor power take-off and the lifting and mounting means are connected to the tractor fluid power system. Thus when the tractor is driven over the tracks the front and rear rail wheels can be lowered onto the tracks to raise the tractor permitting it to be driven along the rails.

Locking means may also be included for securing the front and rear frame sections in position when the rear wheels are lowered onto the tractor. They may be a rigid bar hinged at one end to one of the front and rear frame sections and securable at the other end to the other of the front and rear frame sections.

The lifting means may comprise an arm pivoted to the front section of the frame with the front rail wheels on one end of the arm remote from the pivot. At least one front hydraulic piston and cylinder are provided between the arm and frame front section for turning the arm and raising and lowering the front rail wheels.

The pivoting means may comprise at least one rear hydraulic piston and cylinder between the rear and front sections of the module frame for turning the rear section and raising and lowering the rear rail wheels.

It is also contemplated that this rail conversion module may be in combination with the engine driven tractor.

DESCRIPTION OF PREFERRED EMBODIMENT

Figure 1:
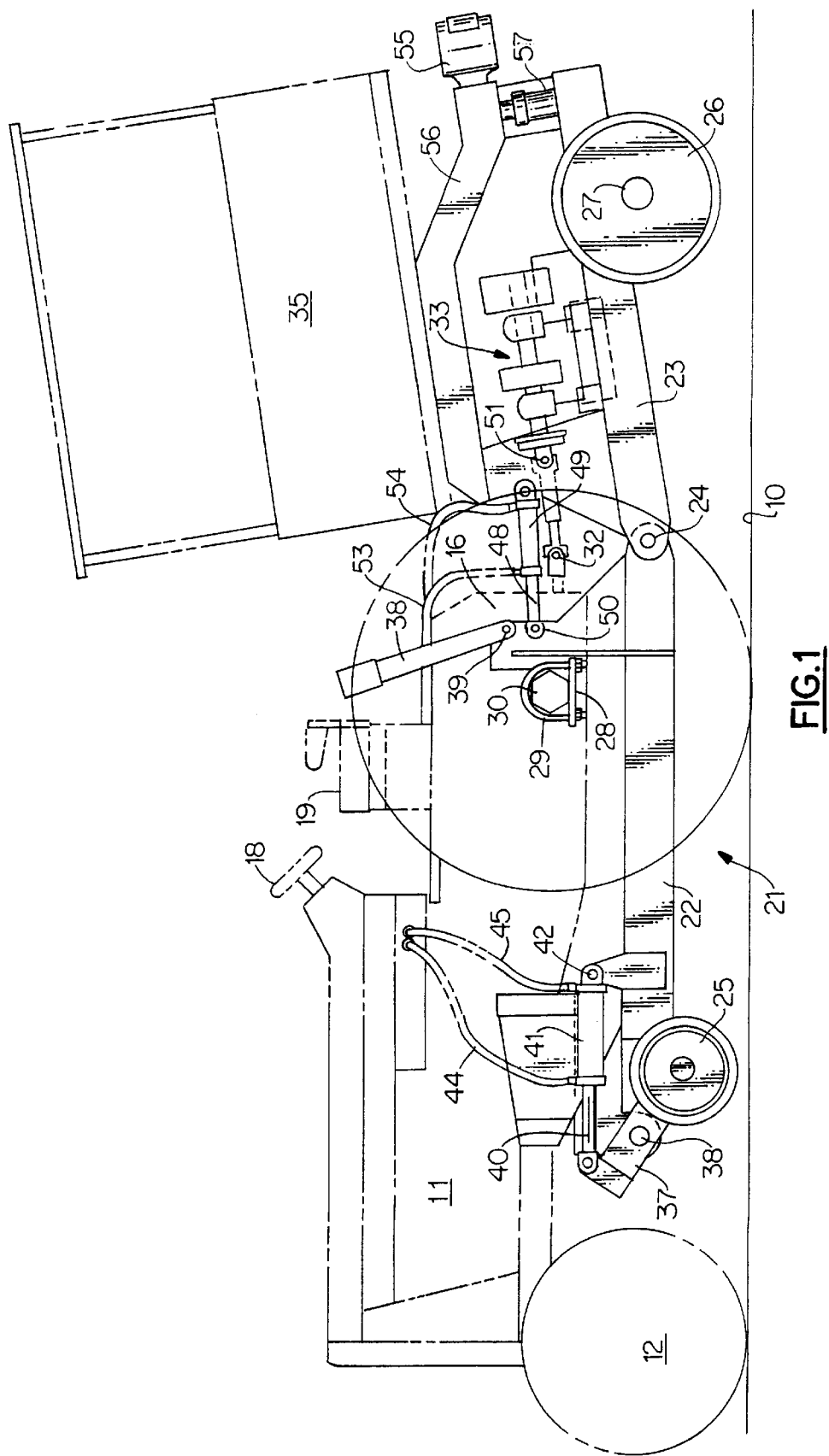
FIG. 1 is an elevation of a conventional engine driven tractor shown in broken lines in combination with the rail conversion module of the invention shown in solid lines, the tractor being on the ground with the rail wheels of the module elevated.

Referring to all of the drawings, a conventional 100HP farm tractor is shown in broken lines adapted to travel on the road or ground 10. Preferably its chassis 11 is of wide front form with a pair of coaxial small diameter front steering ground wheels 12 spaced apart more widely than rails 13 of a conventional gauge railroad shown in FIG. 2. Its pair of larger diameter coaxial rear ground wheels 14 are even more widely spaced as shown in FIG. 3. The engine of the tractor may have an hydraulic power system and a conventional engine-driven rear power take-off 16. It has conventional brakes and other standard equipment. As in all tractors, a steering wheel 18 and a driver's seat 19 are included.

In accordance with the invention a rail conversion module 18 is provided shown in the drawings in solid lines. The module includes a frame 21 essentially in two hinged parts, namely a front section 22 and a rear section 23 joined at pivots 24. A pair of conventional coaxial front rail wheels 25 are included displacably mounted with respect to the front section 22 of the frame 21 in a manner described below. A pair of somewhat larger driven rear rail wheels 26 are mounted on a common axle 27 on the rear section 23 of the frame 21. The pairs of rail wheels 25 and 26 are shown in rolling engagement with the railroad track 13 in FIG. 2.

Figure 2:
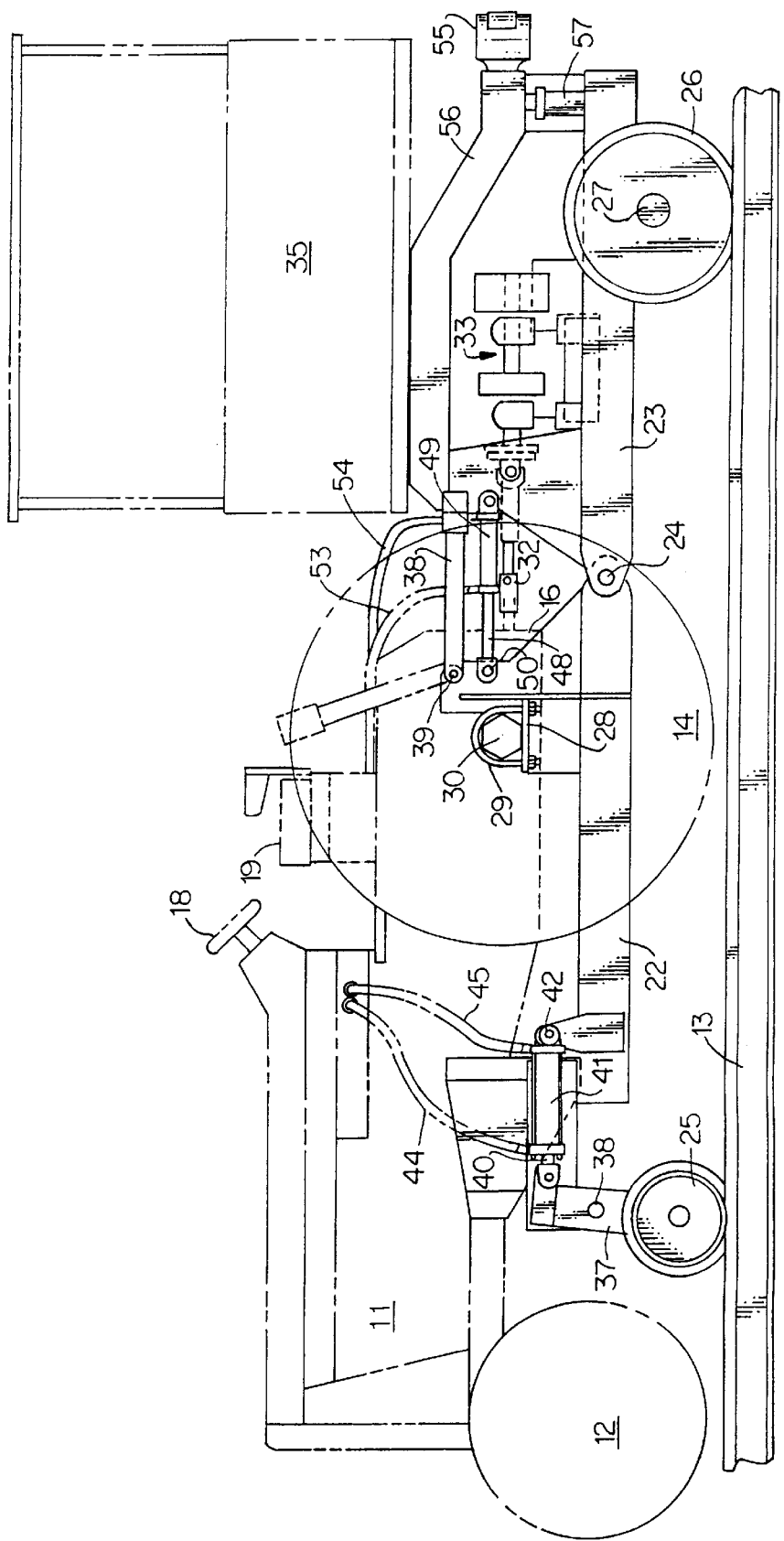
FIG. 2 is an elevation similar to FIG. 1 showing the tractor and rail conversion module on the rails of a railroad track with the ground wheels of the tractor elevated.
Figure 3:
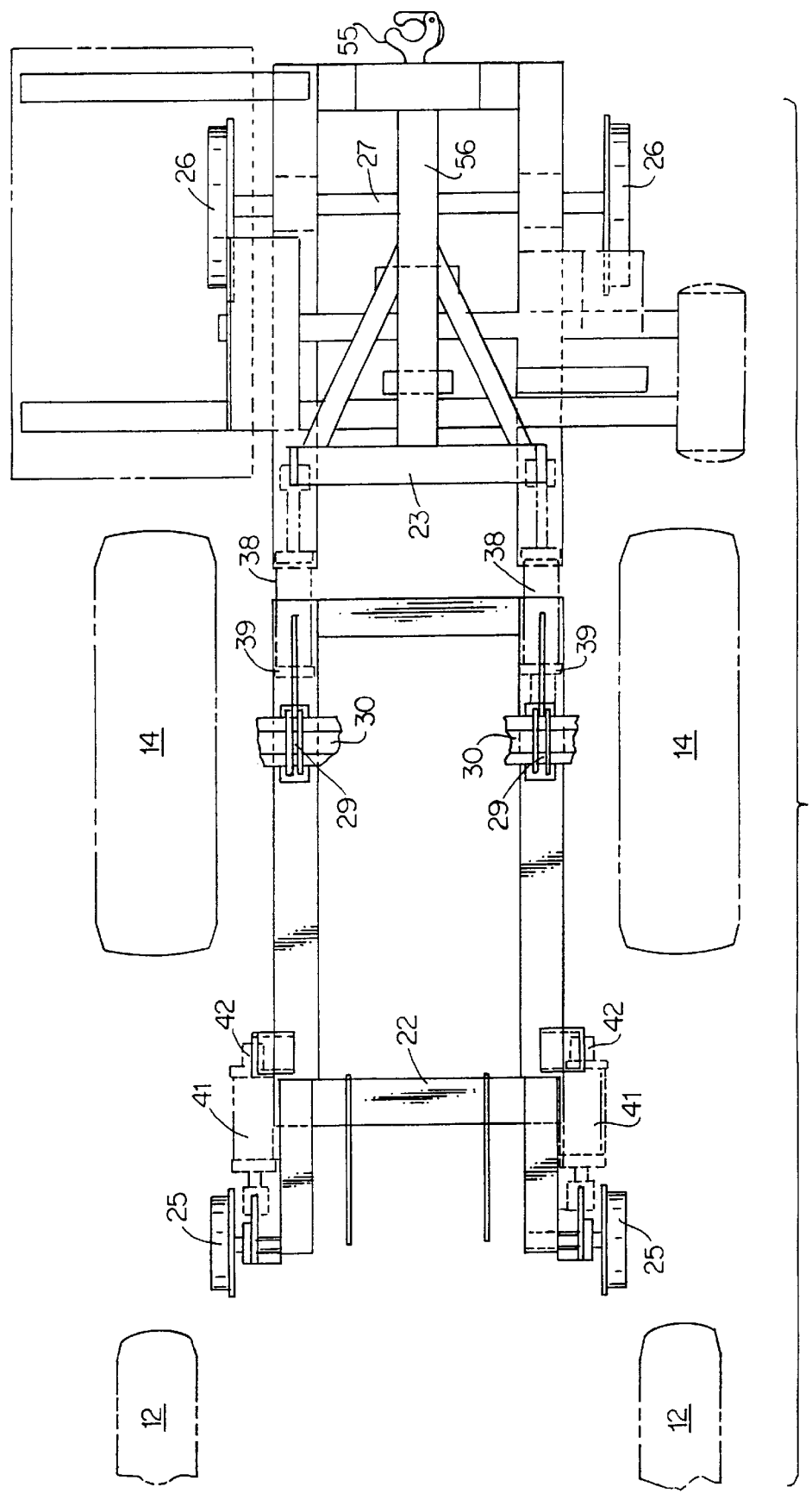
FIG. 3 is a plan view of the tractor and rail conversion module of FIG. 2.

The front section 22 of the module frame 21 is releasably and rigidly secured to the tractor chassis 11 by suitable attachment means part of which is illustrated in FIGS. 1 and 2 as a transverse plate 28 on the front section 22 with U-bolts 29 extending upwardly and around a member 30 anchored to the chassis 11 of the tractor.

An articulated connector 32 is secured to the power take-off 16 of the tractor and through a suitable drive train 33 is joined in driving relation with the real rail wheels 26. This articulated connection permits the rear rail wheels 26 to be driven by the engine of the tractor perferably through a hydrostatic system and permits the drive train 33 to move with the module rear frame section 23 on which it is mounted between the positions shown in FIGS. 1 and 2. An operator can control the driving of the rear rail wheels 26 by the tractor engine from a position in a module cab 35 mounted on the rear section 23 of the module frame 21.

It is to be understood that the rail conversion module 18 may include various rail functions with the tractor furnishing the prime power. For example, the module 18 may include a specific form of the hydrostatic drive system mentioned previously, an auxiliary hydraulic system for a traction booster as described below and a train brake system.

When the rear rail wheels 26 are on the tracks 13 the rear frame section 23 can be secured in level position as shown in FIG. 2 by a pair of movable locking bars 38. As shown in FIG. 1 the locking bars 38 are mounted on pivots 39 to the front frame section 22 and can be swung downwardly to the position shown in FIG. 2. When in that downward position the locking bar ends remote from the pivots 39 fit within appropriate sockets in the rear frame section 23 and thus hold the rear frame section 23 in its level position shown in FIG. 2.

Lifting means are provided for raising and lowering the front rail wheels 25 with respect to the frame front section 22. The lifting means comprises a pair of arms 37 for the respective two front rail wheels 25 which are mounted by pivot pins 38 to the front section 22 of the frame 21. The front rail wheels 25 are rotatably mounted on a lower end of the arms 37 remote from the pivot pins 38. The end of each arm 37 remote from the associated front rail wheel 25 is connected to a piston 40 associated with a hydraulic cylinder 41 and the other end of each cylinder 41 is movably attached at 42 to the front section 22 of the frame 21. Each of the pistons 40 and cylinders 41 are double acting and therefore hydraulic lines 44 and 45 from the ends of each cylinder 41 are connected to the hydraulic power system of the tractor. With the engine of the tractor in operation, the pistons 40 and cylinders 41 can turn the arms 37 about the pivot pins 38 and thereby raise or lower the front rail wheels 25.

Pivoting means on the frame 21 can also raise and lower the rear rail wheels 26. The pivoting means comprises a pair of rear pistons 48 and cylinders 49 on the respective sides of the module frame 21. One end of each piston 48 is secured at a pin 50 to the front frame section 22. The remote end of the associated cylinder 49 is movably attached at 51 to the hinged rear section 23 of the module frame 21. Hydraulic lines 53 and 54 extend from the opposite ends of each cylinder 49 to associated hydraulic power lines in the tractor. When operating the pistons 48 within their cylinders 49 the rear section 23 of the module frame 21 may be moved from its raised position shown in FIG. 1 where the rear rail wheels 26 are off the tracks 13 to the lower position shown in FIG. 2 where they are in rolling engagement with the tracks 13.

A conventional coupler 55 is located on the rear of the rear section 23 for connection to a rail car. It is known to combine such a coupler 55 with a traction booster system to increase the downward force of the rear rail wheels 26 on the rails 13. In such a system the coupler 55 is mounted on an arm 56 angularly movable on the rear frame section 23 and one or more hydraulic pistons and cylinders are located at 57 to force the arm 56 upwardly and thereby force the rear rail wheels 26 downwardly when the module is attached to a rail car by the coupler 55.

The operation of the rail conversion module of the invention will now be described. It is mounted on the chassis 11 of the tractor by first backing the tractor over the front section 22 of the module frame 21 with its rail wheels 25 and 26 in the position shown in FIG. 1. The lifting means for the front rail wheels 25 are operatively connected to the tractor by the hydraulic lines 44 and 45 and the pivoting means for the rear rail wheels 26 are connected to the tractor by the hydraulic lines 53 and 54. The module frame 21 is elevated by downward movement of the rail wheels 25 and 26 to the position shown in FIG. 2 and the front section 22 thereof is affixed to the tractor chassis 11 by the U-bolt 29 and whatever other attachment means are deemed appropriate. At this point both pairs of rail wheels 25 and 26 are in the raised position shown in FIG. 1. The drive for the rear rail wheels 26, namely the articulated connector 32, is operatively joined to the power take-off 16 of the tractor. At this point the rail conversion module is as shown in FIG. 1 and the tractor can be driven about in the conventional manner on the ground 10 as desired.

For rail travel the tractor is driven over the tracks 13. By operation of the pistons 40 and cylinders 41 the pair of front rail wheels 25 are lowered from the position shown in FIG. 1 to the position shown in FIG. 2. Similarly by operation of the pistons 48 and cylinders 49 the rear rail wheels 26 are lowered from the position shown in FIG. 1 to the position shown in FIG. 2. In this lowered position the front and rear rail wheels 25 and 26 are in appropriate rolling engagement with the tracks 13. The locking bar 38 is swung downwardly from the position shown in FIG. 1 to the aligned position shown in FIG. 2 to secure the front and rear frame sections 22 and 23 in the level position shown in FIG. 2. At this point the entire tractor is slightly elevated so that its ground wheels 12 and 14 are above the tracks 13 as shown in FIG. 2.

The scope of the invention is to be determined from the following claims rather than the foregoing description of a preferred embodiment.

What is claimed is:

1. For use with an engine driven tractor having a chassis with a rear power take-off and a fluid power system and with respective pairs of coaxial front steering and rear driving ground wheels each spaced differently than rails of a railroad track, a rail conversion module mountable on the tractor chassis comprising
   a) respective pairs of coaxial front and rear rail wheels spaced for rolling engagement on said tracks;
   b) a module frame having hinged front and rear sections with the front rail wheels on the front section and the rear rail wheels on the rear section;
   c) attachment means on the module frame for affixing the front section to the tractor chassis;
   d) an articulated connector for placing the rear rail wheels in driving relation with the tractor power take-off;
   e) lifting means on the module frame operable by the tractor fluid power system for raising and lowering the front rail wheels with respect to the frame front section; and
   f) pivoting means on the module frame operable by the tractor fluid power system for turning the rear section so as to raise and lower the rear wheels with respect to the front section;
   g) whereby upon driving the tractor over the module frame front section with the frame front section affixed to the tractor chassis and all rail wheels raised, the rear rail wheels are connected to the tractor power take-off and the lifting and pivoting means are connected to the tractor fluid power system, so that when the tractor is driven over the tracks the front and rear rail wheels can be lowered onto the tracks to raise the tractor permitting it to be driven along the rails.

2. A rail conversion module according to claim 1 which further includes locking means for securing the front and rear frame sections in position when the rear rail wheels are lowered onto the tracks.

3. A rail conversion module according to claim 2 wherein the locking means is a rigid bar hinged at one end to one of the front and rear frame sections and securable at the other end to the other of the front and rear frame sections.

4. A rail conversion module according to claim 1 wherein the lifting means comprises an arm pivoted to the front section of the frame with the front rail wheels on one end of the arm remote from the pivot, and at least one front piston and cylinder between the arm and frame front section for turning the arm and raising and lowering the front rail wheels.

5. A rail conversion module according to claim 1 wherein the pivoting means comprises at least one rear piston and cylinder between the rear and front sections of the module frame for turning the rear section and raising and lowering the rear rail wheels.

6. A rail conversion module according to claim 1 wherein the tractor road wheels of each pair thereof are spaced apart more than the railroad rails.

7. In combination with an engine driven tractor having a chassis with a rear power take-off and a hydraulic power system and with respective pairs of coaxial front steering and rear driving ground wheels each spaced wider than rails of a railroad track, a rail conversion module mounted on the tractor chassis comprising a) respective pairs of coaxial front and rear rail wheels spaced for rolling engagement on said tracks;

b) a module frame having hinged front and rear sections with the front rail wheels on the front section and the rear rail wheels on the rear section;

c) attachment means on the module frame fixing the front section to the tractor chassis;

d) an articulated connector placing the rear rail wheels in driving relation with the tractor power take-off;

e) lifting means on the module frame operable by the tractor hydraulic power system for raising and lowering the front rail wheels with respect to the frame front section; and f) pivoting means on the module frame operable by the tractor hydraulic power system for turning the rear section so as to raise and lower the rear rail wheels with respect to the front section;

g) whereby upon driving the tractor over the module frame front section with the frame front section affixed to the tractor chassis and all rail wheels raised, the rear rail wheels are connected to the tractor power take-off and the lifting and pivoting means are operatively connected to the tractor hydraulic power system, so that when the tractor is driven over the tracks the front and rear rail wheels can be lowered onto the tracks to raise the tractor permitting it to be driven along the rails.

8. A rail conversion module according to claim 7 which further includes locking means for securing the front and rear frame sections in position when the rear rail wheels are lowered onto the tracks.

9. A rail conversion module according to claim 7 wherein the lifting means comprises an arm pivoted to the front section of the frame with the front rail wheels on one end of the arm remote from the pivot, and at least one front piston and cylinder between the arm and frame front section for turning the arm and raising and lowering the front rail wheels.

10. A rail conversion module according to claim 7 wherein the pivoting means comprises at least one rear piston and cylinder between the rear and front sections of the module frame for turning the rear section and raising and lowering the rear rail wheels.

* * * * *